(12) United States Patent
Hidaka et al.

(10) Patent No.: US 6,734,087 B2
(45) Date of Patent: May 11, 2004

(54) METHOD FOR FABRICATING ELECTRODE DEVICE

(75) Inventors: Kishio Hidaka, Hitachiota (JP); Yoshimichi Numata, Mito (JP); Mitsuo Hayashibara, Hitachinaka (JP); Mitsutoshi Honda, Hitachi (JP); Takashi Naitou, Mito (JP); Hideyo Komada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/288,489

(22) Filed: Nov. 6, 2002

(65) Prior Publication Data

US 2003/0087511 A1 May 8, 2003

(30) Foreign Application Priority Data

Nov. 7, 2001 (JP) ........................ 2001-341352

(51) Int. Cl.⁷ .................. H01L 27/082; H01L 27/102; H01L 29/70; H01L 31/11
(52) U.S. Cl. ........................ 438/584; 438/680
(58) Field of Search ................. 438/584, 585, 438/586, 597, 602, 603, 604, 680, 681

(56) References Cited

U.S. PATENT DOCUMENTS 6,168,673 B1 * 1/2001 Kanekiyo et al. ........... 148/122
6,386,269 B1 * 5/2002 Kanekiyo et al. ........... 164/463

FOREIGN PATENT DOCUMENTS

| GB | 2353138 | 2/2001 |
|----|---------|--------|
| JP | 10-12124 | 1/1998 |
| JP | 11-111158 | 4/1999 |
| JP | 11-111161 | 4/1999 |
| JP | 2000-36243 | 2/2000 |
| JP | 2000-67736 | 3/2000 |

* cited by examiner

Primary Examiner—David Nhu
(74) Attorney, Agent, or Firm—Dickstein Shapiro Morin & Oshinsky LLP

(57) ABSTRACT

An electrode device for an electric field emission electron source suitable for duty drive having an element size of 50 μm or smaller and an electrode device fabricating method. A glass film used as catalyst of forming carbon nanotubes is formed on a substrate to form metal catalyst at nano meter level and control dispersion. Carbon nanotubes are dispersively formed on the metal catalyst and a metal coat is formed on the surface of carbon nanotubes to improve electric pulse response characteristics.

11 Claims, 7 Drawing Sheets

METHOD FOR FABRICATING ELECTRODE DEVICE

BACKGROUND OF THE INVENTION

1. Field of the Invention

The present invention relates to an electrode device for electron emission and its fabrication method.

2. Description of the Related Art (1) Electron Emission

According to conventional electrode techniques, emitters for electron emission have been formed by dispersing carbon nanotubes into slurry as conductive auxiliary and coating them on a metal cathode by screen printing (JP-A-11-111158, JP-A-11-111161, JP-A-2000-36243, JP-A-10-12124, GB 2353138). This method is simple, economical and easy to realize a large screen. There is another method by which carbon is grown in an alumina mold and a grown carbon column is used as an emitter (JP-A-2000-67736). With screen printing, however, it is difficult to control the number, vertical orientation and length of carbon nanotubes in an electrode in-plane and an ohmic contact with a cathode substrate, so that uniformity in the electrode in-plane cannot be realized. A mold carbon column is associated with a difficulty of controlling an ohmic contact and diameter so that an electric field is difficult to be raised and a large electric field is necessary for electron emission.

(2) Electrode

A spin transfer effect has been reported, which transfers magnetic spins by wiring a carbon naonotube between the source and drain. Fabrication of ultra fine transistors has also been reported. This fabrication utilizes the fact that metallic or semiconductive nature is presented depending upon a difference of chirality of single-walled carbon nanotubes. Metal electrodes are attached to both ends of single-walled carbon nanotubes forming several tens of bundles. Large current is flowed to realize resistance heating to selectively break only metallic nature carbon nanotubes and leave only semiconductive nature carbon nanotubes.

Since the size of a carbon nanotube is very small, it is difficult to process it and a large scale circuit is impossible to be fabricated by using such carbon nanotubes.

SUMMARY OF THE INVENTION

It is an object of the present invention to provide an electrode device for an electric field emission electron source suitable for duty drive having an element size of 50 µm or smaller and an electrode device fabricating method.

The invention provides an electrode device which is fabricated by forming a glass film to be used as catalyst for forming carbon nanotubes, on a substrate to form metal catalyst at a nano meter level and control dispersion, dispersively forming carbon nanotubes on the metal catalyst and forming a metal coat on the surfaces of the carbon nanotubes to improve electric pulse response characteristics, and also provides a fabrication method for such an electrode device.

According to the method of fabricating a nano electrode device of the invention, uniform current is input and output in the in-plane of the device. More specifically, electron emission is realized which has no current loss to be caused by dielectric polarization. The current loss corresponds to the response characteristics of an output current relative to an input current. The amplitude and time of an output current responds sufficiently to the amplitude and time of an input current.

According to the fabrication method of the invention, a sputter glass film forming process quite different from conventional methods is introduced to efficiently form an electrode for electron emission.

According to the fabrication method of the invention, an acceleration voltage up to 50 keV can be applied.

The invention provides a display panel, a projector light source or an electron beam drawing apparatus mounted with an electron device capable of emitting electron beams at 50 keV or lower characterized in uniform electron beam emission in the in-plane of the electrode device. The electrode device has among others an emitter for electron beam emission, a grid for attracting electrons and a converging lens for converging electron beams, and can obtain a high current density.

Other objects, features and advantages of the invention will become apparent from the following description of embodiments when read in conjunction with the accompanying drawings.

DETAILED DESCRIPTION OF EMBODIMENT

1. First Embodiment

Figure 1:
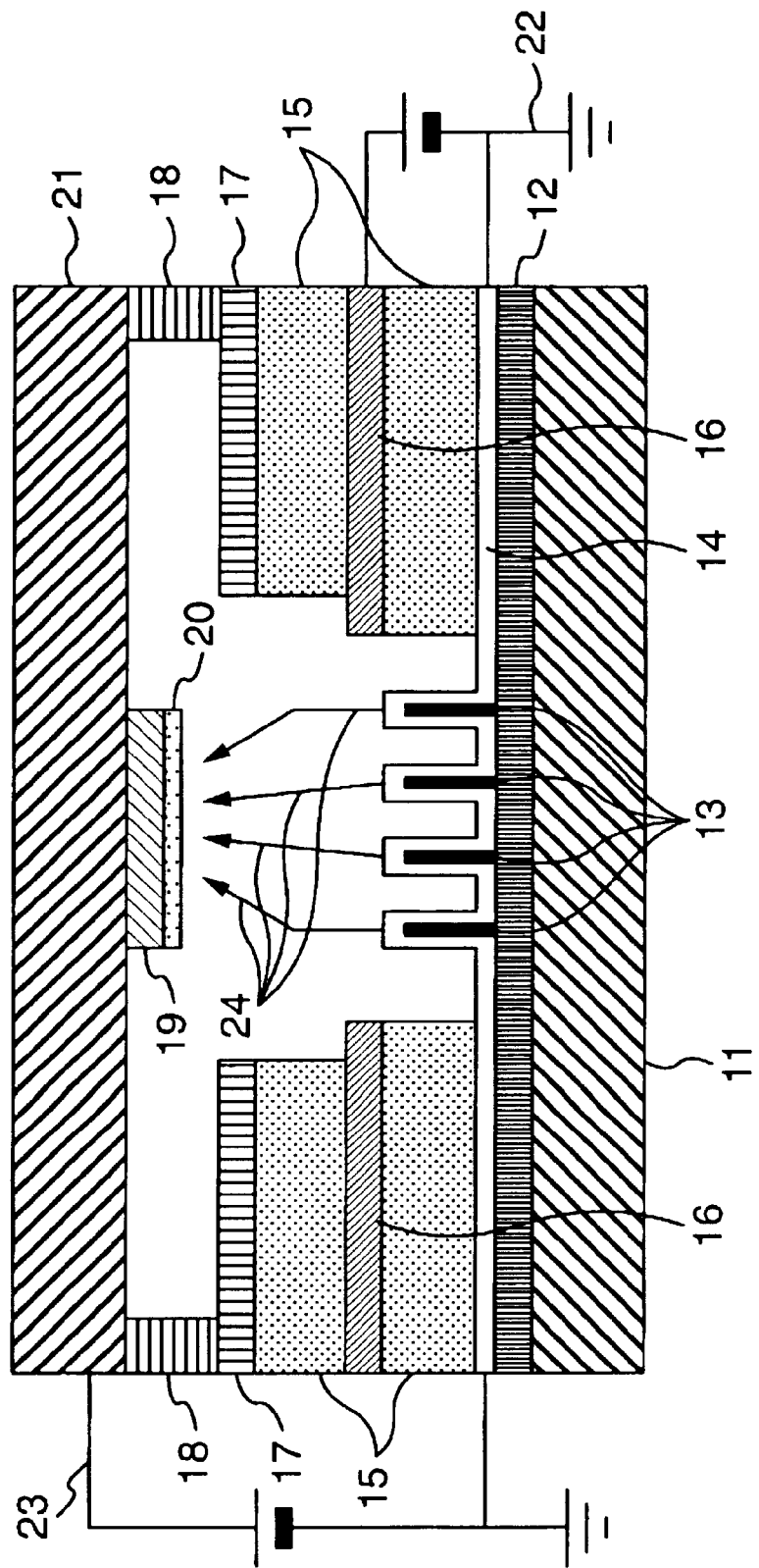
FIG. 1 is a cross sectional view of an electrode structure formed on a glass substrate according to the invention.

FIG. 1 is a cross sectional view of an electrode device according to the invention. The electrode device is constituted of: a glass substrate 11; a sputtered glass film 12: emitter electrodes 13 made of carbon nanotubes; a metal coated cathode 14 formed over the whole surface of the glass substrate; an insulating layer 15 formed on both sides of the emitter electrodes 13; a grid electrode 16 formed on the insulating layer; another insulating layer 15; a converging electrode 17 formed on the other insulating layer 15; and an anode electrode 21 formed on a spacer 18 on the converging electrode. A current circuit is made of independently connected two systems: a grid circuit 22 between the cathode 14 in contact with the emitter electrodes 13 and the grid electrode 16; and an anode circuit 23 between the cathode 14 and anode electrode 21. As a potential difference at a maximum of 70 V appears across the grid circuit 22, electrons are emitted from the emitter 13. Emitted electrons pass through the grid electrode along trajectories 24, are converged by the lens effect of an equipotential plane generated by the converging electrode 17, and reach the anode electrode 21. The anode electrode 21 was made of general material. An applied voltage of the anode circuit 23 was about 1 to 10 kV. A transparent conductive film 19 was formed on the anode 21, and after high voltage green phosphor 20 is attached to the transparent conductive film 19, the film 19 was supported by an aluminum protective film.

Figure 2:
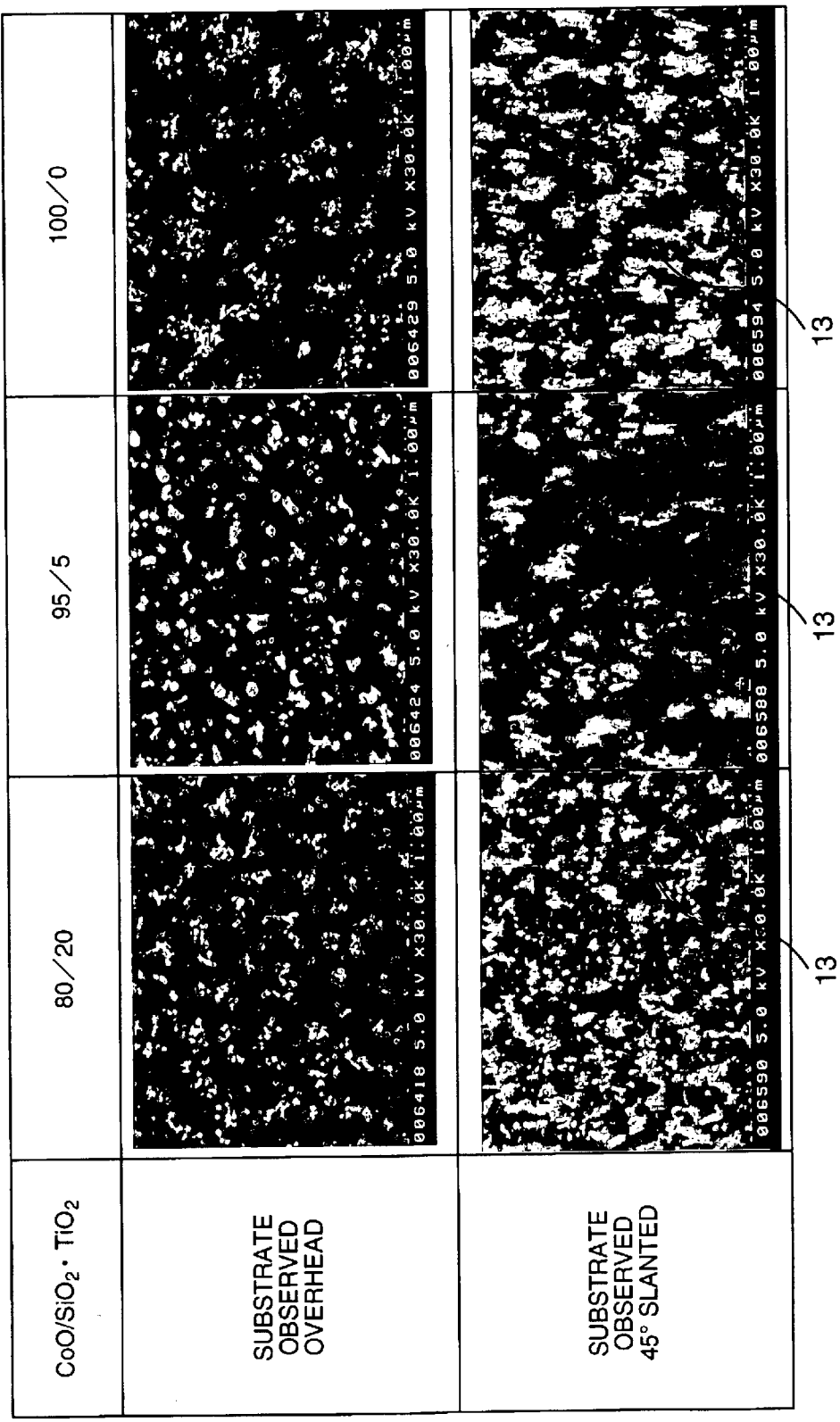
FIG. 2 shows secondary electron beam images taken with a scanning electron microscope, illustrating the influence of an $SiO_2$ addition amount upon emitter dispersion according to a fabrication method of the invention.

The main feature of the invention resides in the material and structure of the electron emitters 13. The distance between adjacent emitters 13 and the length of each emitter 13 are determined by the size and dispersion of CoO glass crystallites 25. FIG. 2 shows secondary electron beam images taken with a scanning electron microscope and illustrating the relation between the growth and distribution of emitters 13 made of carbon nanotubes and the mixture ratio between $SiO_2$ 26 and/or $TiO_2$ and CoO glass 25 of nano size crystallites. The larger the mixture ratio of CoO 25, the longer the distance between adjacent emitters 13 made of carbon nanotubes is and the denser the in-plane density of emitters 13 is. It has been found that the growth of the emitters 13 made of carbon nanotubes takes an approximately conical shape and that the longest carbon nanotube is about 200 $\mu$m and the distance between emitters is proportional to the mixture ratio of CoO glass 25.

Figure 3:
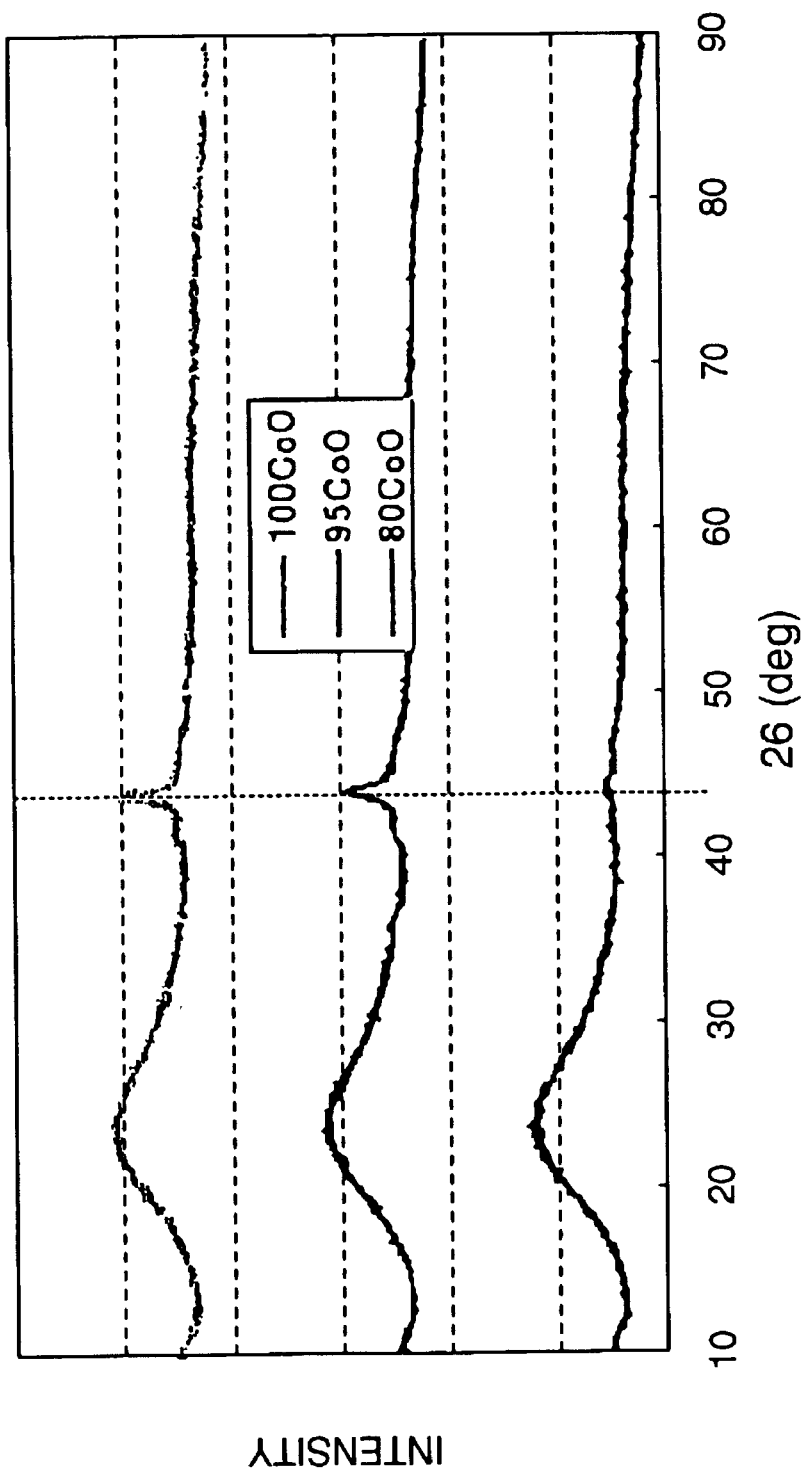
FIG. 3 is a graph showing X-ray diffraction illustrating the influence of an $SiO_2$ addition amount upon crystallite growth orientation according to the fabrication method of the invention.

FIG. 3 shows X-diffraction representative of the crystallinity of CoO glass 25 grown by RF sputtering. The growth direction of crystallites of the CoO film 25 was coincident with the closest packed plane of a face-centered cubic lattice. It has been found therefore that the size of metal catalyst on all nano glass crystallites formed dispersively is about 10 nano meters and all metalographyic crystal orientations are aligned in the same direction.

For general conditions of forming carbon nanotubes, it is desired that the grain diameter of a crystallite is 50 nano meters or smaller. The crystallite may be made of metal oxide. The metal oxide may be oxide of an element of group IVb or group VIII of the periodic table. The growth directions of crystallites made of metal oxide in a glass film are desired to have the same orientation.

Figure 4:
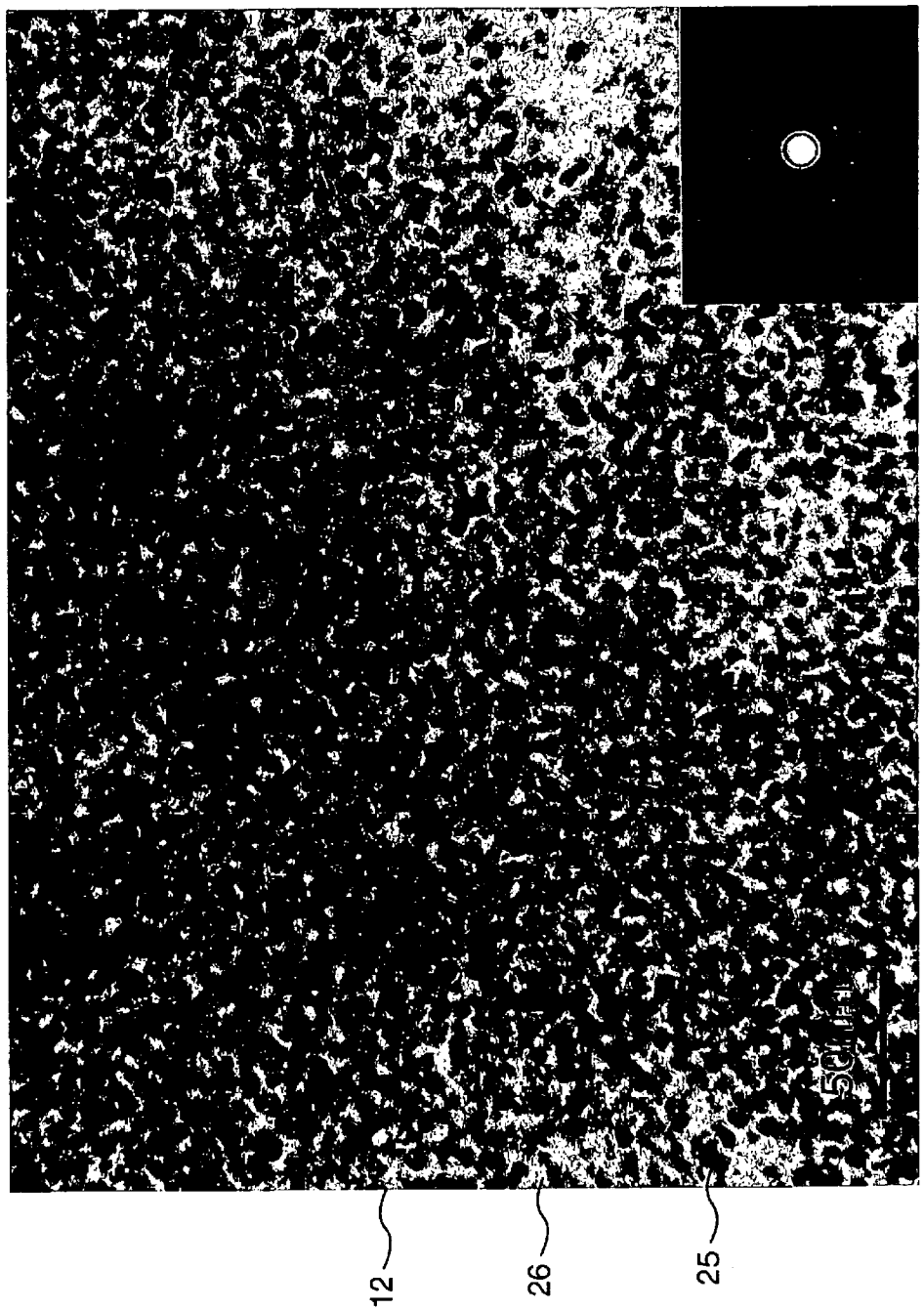
FIG. 4 shows a high resolution image of an in-plane of an $SiO_2$-doped CoO sputter film taken with a transmission electron microscope according to the fabrication method of the invention.

FIG. 4 is a high resolution image of an in-plane structure of a CoO glass film 12 reduced with hydrogen. An average diameter of CoO glass crystallites is about 10 nano meters, and the distribution of crystallites can be approximated by a Gauss distribution at very high precision. The grain diameters of crystallites are almost uniform at 10 nano meters.

Figure 5:
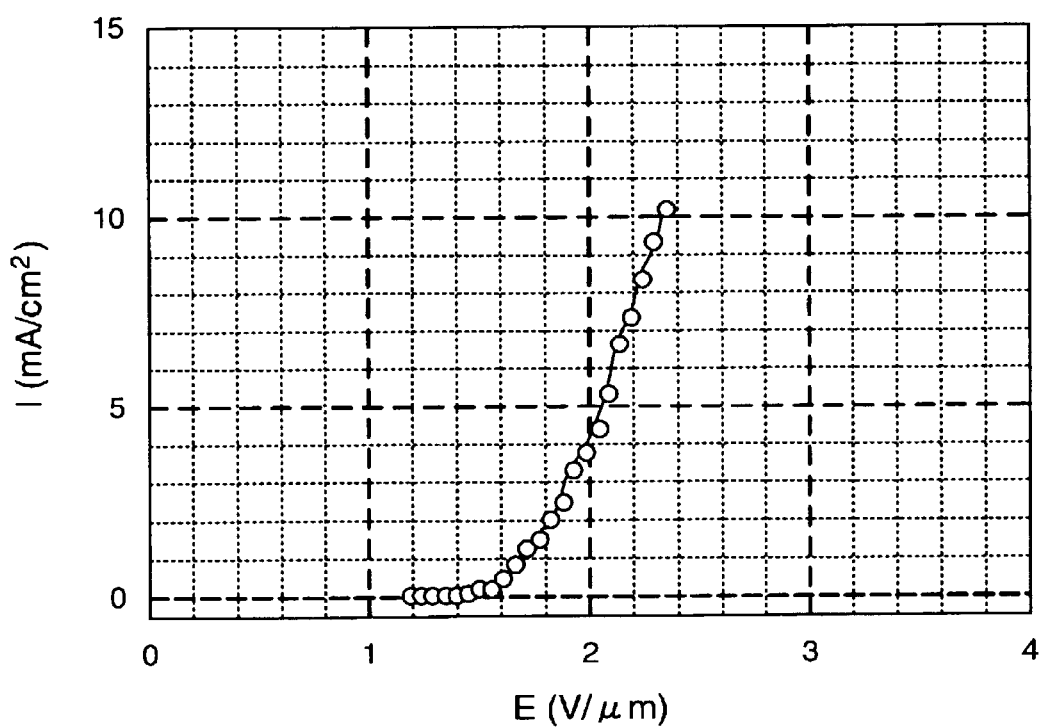
FIG. 5 is a graph showing an electric field-current density of an electrode device formed on a glass substrate by the fabrication method of the invention.

FIG. 5 shows the relation between an electric field and a current density of electron emission of carbon nanotubes. Although current emission does not occur as an electric field is strengthened initially, it starts at the electric field of about 0.5 V/$\mu$m, and thereafter a correlated relation between the current density and electric field capable of being linearly approximated is maintained.

2. Second Embodiment

In this embodiment, the glass substrate of the first embodiment is replaced with a silicon single crystal substrate. The influence of the substrate upon the carbon nanotube fabrication mechanism has been studied.

Figure 6:
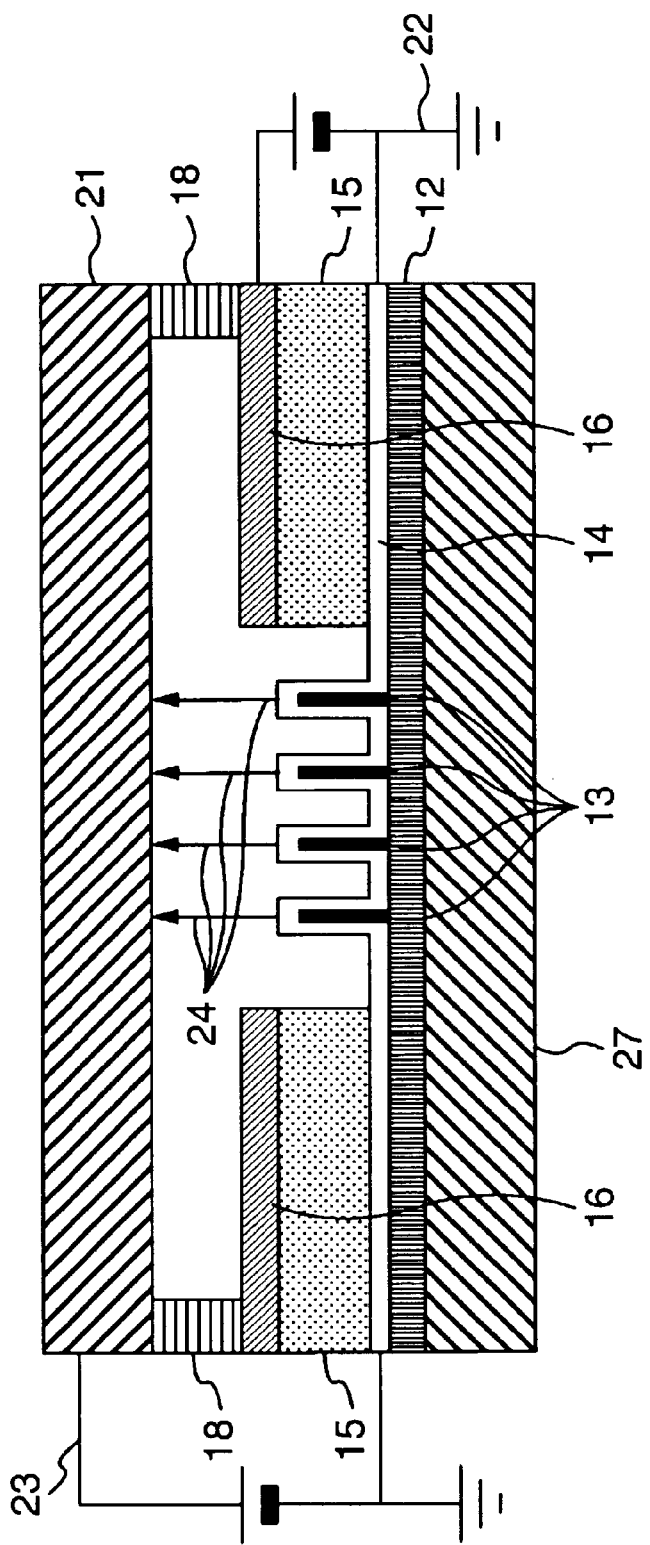
FIG. 6 is a cross sectional view of an electrode structure formed on a silicon substrate according to the invention.

FIG. 6 is a cross sectional view of an electrode device. Similar to the first embodiment, the electrode device is constituted of: a silicon (Si) substrate 27; a sputtered glass film 12: emitter electrodes 13 made of carbon nanotubes; a metal coated cathode 14 formed over the whole surface of the Si substrate; an insulating layer 15 formed on both sides of the emitter electrodes 13; a grid electrode 16 formed on the insulating layer; and an anode electrode 21 formed on a spacer 18 on the grid electrode. A current circuit has a triode structure made of independently connected two systems: a grid circuit 22 and an anode circuit 23.

Figure 7:
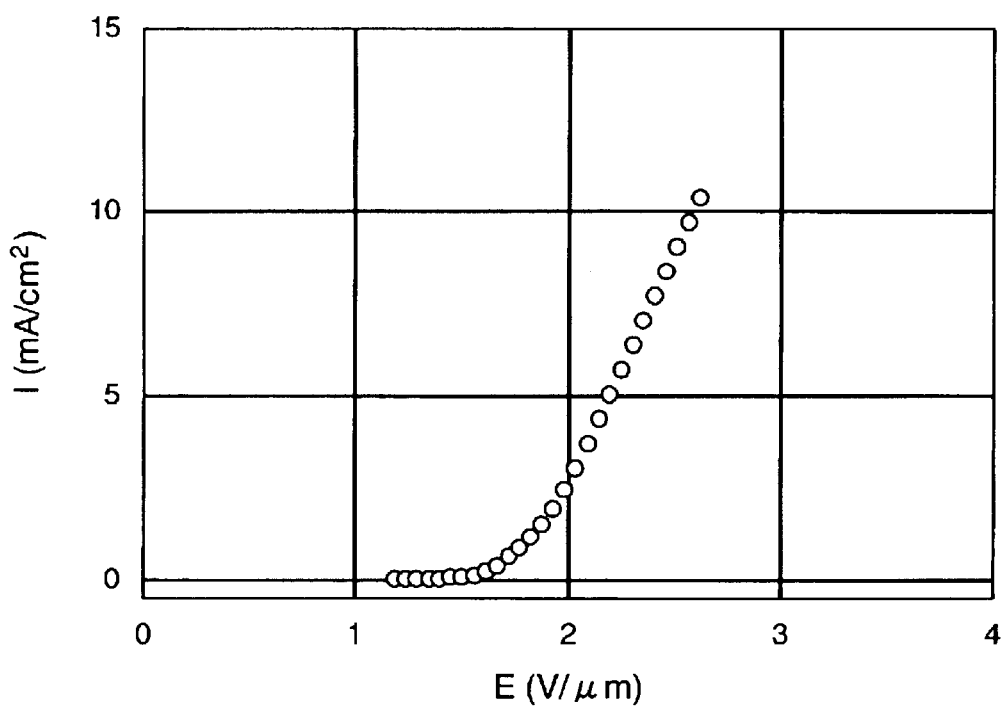
FIG. 7 is a graph showing an electric field-current density of an electrode device formed on a silicon substrate by the fabrication method of the invention.

FIG. 7 shows the relation between an electric field and a current density of electron emission of carbon nanotubes. Although current emission does not occur as an electric field is strengthened initially, it starts at the electric field of about 0.6 V/$\mu$m, and thereafter a correlated relation between the current density and electric field capable of being linearly approximated is maintained.

According to the invention, nano size crystallites are formed by sputtering glass having an excellent tight contact with a substrate. After the glass film is formed, glass is reduced to form metal nano grains in the central area of each glass nano size crystallite. Glass reduction was performed by circulating hydrogen gas at the same time when carbon nanotubes were formed by CVD. CoO was used for forming glass components as catalyst on the substrate and $SiO_2$ and $TiO_2$ were used as additives. Since additives are formed along the grain boundaries of CoO nano crystallites, they are effective for uniformly dispersing CoO crystallites. After the CoO crystallites are formed, carbon nanotubes are grown by CVD at dispersed nano catalyst. The distance between adjacent longest nanotubes at the tips thereof is desired to be 1 nano meter or longer. In order to have an ohmic contact between the outer surfaces of the carbon nanotubes and the substrate, the metal film coating is performed. According to the invention, current having a waveform similar to the pulse waveform of an input current can be output. The surface specific resistance of carbon nanotubes covered with a metal coat is desired to be $10^{-3}$ $\Omega \cdot$cm or smaller.

According to the embodiments described above, carbon nanotubes are disposed with a controlled distance between adjacent tubes and a high resistance of the carbon nanotubes is lowered to suppress dielectric polarization to be caused by the high resistance of the carbon nanotubes. It is therefore possible to properly follow duty drive without lowering a response speed of current having a pulse waveform transmitted from an electron source. It is also possible to prevent deterioration to be caused by collision of residual gas with the emitters during electron emission if the vacuum degree is insufficient.

Since glass is sputtered, crystal grains of a nano meter size can be uniformly distributed and the growth direction of glass crystallites can be made crystallographyically the same. There is therefore no variation in the orientation and length of nanotubes. Hydrogen reduction forms a reduced nano metal grain in the central area of each crystallite in the nano glass film. By changing the mixture ratio of insulating glass such as $SiO_2$ and utilizing the nature that the amorphous $SiO_2$ likely to segregate at the grain boundaries dispersively forms CoO crystallites, nanotubes or nanowires using nano metal grains as catalyst are dispersively formed. By using the formed nanotubes or nanowires as molds, a metal coat is formed on the surface of the nanotubes or nanowires. Therefore, the electron conductivity and the in-plane uniformity of electron emission can be improved considerably so that low voltage drive is possible.

According to the electrode device fabricating method of the invention, carbon nanotubes can be formed with a wide selection range of a substrate material. Sputtering glass components on a substrate allows to dispersively form metal nano grains having the same crystal growth orientation. It is therefore possible to control the distance and growth direction of adjacent carbon nanotubes and optimize the electron emission characteristics. The invention can provide an electric field emission type display, a projector light source, and an electron beam drawing apparatus by using the electron emission device.

In the embodiments described above, although nanotubes are made of carbon (C), the following modifications are possible.

The main components of the chemical composition of nanotubes may be carbon of 80 atomic percents or larger. The main component of the chemical composition may be compound of C, B and N. The main component of the chemical composition may be a metal element of group IVb and group VIb of the periodic table.

The present invention has been described in connection with the preferred embodiments. It is apparent that various modifications, corrections, and the like can be made by those skilled in the art without departing from the spirit and appended claims of the invention.

What is claimed is:

1. A method of fabricating an electrode device comprising steps of:

forming a glass film of material having glass components on a semiconductor, metal or insulating substrate to form crystallites having a grain diameter of 50 nm, or smaller;

growing and dispersively forming nanotubes or nanowires by using the crystallites as nuclei of catalyst, a dispersion of the crystallites relating to a distribution of the nanotubes or nanowires; and forming a metal coat on surfaces of the nanotubes or nanowires.

2. A method according to claim 1, wherein a chemical component of the glass film is oxide which contains elements of group IVb or VIII of the periodic table.

3. A method according to claim 1, wherein the crystallites in the glass film are made of metal oxide and growth directions of crystallites have all a same orientation.

4. A method according to claim 1, wherein a distribution of diameters of the crystallites in the glass film is approximately a Gauss distribution.

5. A method of fabricating an electrode device comprising steps of:

forming a glass film of material having glass components on a semiconductor, metal or insulating substrate to form crystallites having a grain diameter of 50 nm or smaller, wherein $SiO_2$ and/or $TiO_2$ are added to the glass components by a proper amount;

growing and dispersively forming nanotubes or nanowires by using the crystallites as nuclei of catalyst; and forming a metal coat on surfaces of the nanotubes or nanowires.

6. A method of fabricating an electrode device comprising steps of:

forming a glass film of material having glass components on a semiconductor, metal or insulating substrate to form crystallites having a grain diameter of 50 nm or smaller;

growing and dispersively forming nanotubes or nanowires by using the crystallites as nuclei of catalyst; and forming a metal coat on surfaces of the nanotubes or nanowires, wherein a surface specific resistance of the nanotubes or nanowires coated with the metal coat is better than $10^{-3}$ $\Omega \cdot cm$.

7. A method of fabricating an electrode device comprising steps of:

forming a glass film of material having glass components on a semiconductor, metal or insulating substrate to form crystallites having a grain diameter of 50 nm or smaller;

growing and dispersively forming nanotubes or nanowires by using the crystallites as nuclei of catalyst, wherein a distance between adjacent longest nanotubes or nanowires at tips thereof is 1 nm or wider; and forming a metal coat on surfaces of the nanotubes or nanowires.

8. A method of fabricating an electrode device comprising steps of:

forming a glass film of material having glass components on a semiconductor, metal or insulating substrate to form crystallites having a grain diameter of 50 nm or smaller;

growing and dispersively forming nanotubes or nanowires by using the crystallites as nuclei of catalyst; and forming a metal coat on surfaces of the nanotubes or nanowires, wherein the nanotubes or nanowires coated with the metal coat are made of material whose chemical composition has carbon of 80 atomic percents or larger as a main component.

9. A method according to claim 1, wherein the nanotubes or nanowires are made of material whose main chemical composition has compound of C, B and N as a main component.

10. A method according to claim 1, wherein the nanotubes or nanowires are made of material whose chemical composition has metal elements of group IVb or VIb of the periodic table.

11. A method according to claim 1, wherein the crystallites are CoO.

* * * * *